United States Patent
Baumgartner

(10) Patent No.: US 10,290,115 B2
(45) Date of Patent: May 14, 2019

(54) DEVICE AND METHOD FOR DETERMINING THE VOLUME OF AN OBJECT MOVED BY AN INDUSTRIAL TRUCK

(71) Applicant: CARGOMETER GmbH, Vienna (AT)

(72) Inventor: Michael Baumgartner, Vienna (AT)

(73) Assignee: CARGOMETER GmbH, Vienna (AT)

( * ) Notice: Subject to any disclaimer, the term of this patent is extended or adjusted under 35 U.S.C. 154(b) by 122 days.

(21) Appl. No.: 15/502,195

(22) PCT Filed: Jul. 15, 2015

(86) PCT No.: PCT/EP2015/001452
§ 371 (c)(1),
(2) Date: Feb. 6, 2017

(87) PCT Pub. No.: WO2016/020038
PCT Pub. Date: Feb. 11, 2016

(65) Prior Publication Data
US 2017/0228885 A1    Aug. 10, 2017

(30) Foreign Application Priority Data
Aug. 8, 2014  (DE) .................. 10 2014 011 821

(51) Int. Cl.
*G06T 7/62* (2017.01)
*G01B 11/04* (2006.01)
(Continued)

(52) U.S. Cl.
CPC ............. *G06T 7/62* (2017.01); *G01B 11/00* (2013.01); *G01B 11/04* (2013.01); *G01B 11/245* (2013.01);
(Continued)

(58) Field of Classification Search
USPC .................. 119/51.02; 235/462.04; 345/419; 348/46, 47, 135, 148; 356/604, 606, 620;
(Continued)

(56) References Cited

U.S. PATENT DOCUMENTS

| | | | |
|---|---|---|---|
| 6,519,359 B1 * | 2/2003 | Nafis | G06T 17/00 348/46 |
| 6,864,903 B2 * | 3/2005 | Suzuki | G06T 17/10 715/757 |

(Continued)

FOREIGN PATENT DOCUMENTS

| | | |
|---|---|---|
| DE | 10339499 A1 | 4/2005 |
| DE | 102010042649 A1 | 4/2012 |

(Continued)

OTHER PUBLICATIONS

MacNamara, S., et al., "Volume measuring device for mobile objects," English Translation of European Patent Publication EP2439487 B1, Aug. 22, 2012.*

(Continued)

*Primary Examiner* — Xuemei G Chen
(74) *Attorney, Agent, or Firm* — Caesar Rivise, PC

(57) ABSTRACT

The invention relates to a device for determining the volume of an object moved by an industrial truck and to a corresponding method. The device comprises a first depth image sensor (3) and a second depth image sensor (4), which are arranged in such a way that the object (1) can be sensed from two different directions as the object passes through the passage region (5), wherein the device (10) is designed to produce a sequence of individual images in a first resolution by means of each of the depth image sensors (3, 4), whereby the industrial truck (2) and the object (1) are sensed from different viewing angles as the industrial truck and the object pass through the passage region (5). The device also comprises a volume-determining apparatus (11), which is (Continued)

designed to subject the sequences of the individual images in the first resolution of the first depth image sensor (3) and of the second depth image sensor (4) to a super resolution processing in order to create a 3-D model (17) comprising the industrial truck (2) and the object (1) in a second resolution that is higher than the first resolution and to determine the volume of the object (1) on the basis of the produced 3-D model (17).

20 Claims, 12 Drawing Sheets

(51) Int. Cl.
| | | |
|---|---|---|
| G01B 11/245 | (2006.01) | |
| G01B 11/00 | (2006.01) | |
| G06T 7/11 | (2017.01) | |
| H04N 13/204 | (2018.01) | |
| G06T 7/20 | (2017.01) | |
| G06T 17/20 | (2006.01) | |

(52) U.S. Cl.
CPC .................. *G06T 7/11* (2017.01); *G06T 7/20* (2013.01); *G06T 17/20* (2013.01); *H04N 13/204* (2018.05); *G06T 2207/10021* (2013.01); *G06T 2207/10028* (2013.01); *G06T 2207/30108* (2013.01)

(58) Field of Classification Search
USPC .......... 452/157; 700/226; 705/7.38; 715/757
See application file for complete search history.

(56) References Cited

U.S. PATENT DOCUMENTS

| | | | | |
|---|---|---|---|---|
| 7,274,470 | B2* | 9/2007 | Lemelin | G01B 11/25 |
| | | | | 356/604 |
| 7,995,218 | B2* | 8/2011 | Crowther | B25B 5/06 |
| | | | | 356/606 |
| 8,654,197 | B2* | 2/2014 | Nizko | G01S 7/4004 |
| | | | | 348/148 |
| 9,170,090 | B2* | 10/2015 | Hansen | B66F 9/0755 |
| 9,373,023 | B2* | 6/2016 | Stoker | G06K 9/00255 |
| 9,478,030 | B1* | 10/2016 | Lecky | G06Q 10/08 |
| 9,574,874 | B2* | 2/2017 | Son | G01B 11/22 |
| 9,769,455 | B2* | 9/2017 | Fisker | A61B 5/0062 |
| 9,906,717 | B1* | 2/2018 | Plank | H04N 5/23232 |
| 10,115,182 | B2* | 10/2018 | Zhang | G06T 3/4053 |
| 2001/0041948 | A1* | 11/2001 | Ross | G06Q 10/08 |
| | | | | 700/226 |
| 2004/0023612 | A1* | 2/2004 | Kriesel | A01K 11/008 |
| | | | | 452/157 |
| 2005/0257748 | A1* | 11/2005 | Kriesel | A01K 11/008 |
| | | | | 119/51.02 |
| 2006/0227132 | A1* | 10/2006 | Jang | G06T 15/205 |
| | | | | 345/419 |
| 2009/0059004 | A1* | 3/2009 | Bochicchio | B66F 9/0755 |
| | | | | 348/148 |
| 2009/0290811 | A1* | 11/2009 | Imai | G06T 3/4061 |
| | | | | 382/285 |
| 2010/0302554 | A1* | 12/2010 | Keshavmurthy | G01B 11/2531 |
| | | | | 356/620 |
| 2012/0118970 | A1* | 5/2012 | Zolotov | G06K 7/10722 |
| | | | | 235/462.04 |
| 2014/0372182 | A1* | 12/2014 | Groble | G06Q 50/28 |
| | | | | 705/7.38 |
| 2015/0003725 | A1* | 1/2015 | Wan | G06T 7/194 |
| | | | | 382/154 |
| 2015/0381968 | A1* | 12/2015 | Arora | G06T 17/00 |
| | | | | 348/47 |
| 2016/0029648 | A1* | 2/2016 | Schmitzek | A22B 5/007 |
| | | | | 348/135 |
| 2016/0231866 | A1* | 8/2016 | Tretter | G06F 3/14 |
| 2017/0366795 | A1* | 12/2017 | Chou | G06T 7/593 |

FOREIGN PATENT DOCUMENTS

| | | |
|---|---|---|
| DE | 202010012985 U1 | 4/2012 |
| DE | 202013002484 U1 | 7/2014 |
| EP | 2439487 A1 | 4/2012 |
| WO | 2005022079 A1 | 3/2005 |
| WO | 2012139575 A1 | 10/2012 |

OTHER PUBLICATIONS

Schuon, et al., "High-quality scanning using time-of-flight depth superresolution," IEEE Computer Society Conference on Computer Vision and Pattern Recognition Workshops, Jun. 2008.*
English language abstract for EP 2439487 A1 (2012).
English language abstract for DE 10339499 A1 (2005).
English language abstract for DE 102010042649 A1 (2012).
English language abstract for DE 202010012985 U1 (2012).
English language abstract for DE 202013002484 U1 (2014).
English language abstract for WO 2005022079 A1 (2005).
Li et al.,"A hybrid camera for motion deblurring and depth map super-resolution", Computer Vision and Pattern Recognition. IEEE Conference On, IEEE, Piscataway, NJ, USA, pp. 1-8 (2008).
Park et al., "Super-resolution image reconstruction: a technical overview", IEEE Signal Processing Magazine, IEEE Service Center, Piscataway, NJ, US, vol. 20, No. 3, pp. 21-36 (2003).
Schuon et al., "High-Quality Scanning Using Time-of-Flight Depth Superresolution". In: IEEE Computer Society Conference on Computer Vision and Pattern Recognition Workshops. S.1-7 (2008).
International Search Report from PCT/EP2015/001452 dated Nov. 12, 2015.

* cited by examiner

FIG. 9A
17
1
FIG. 9B
17
1
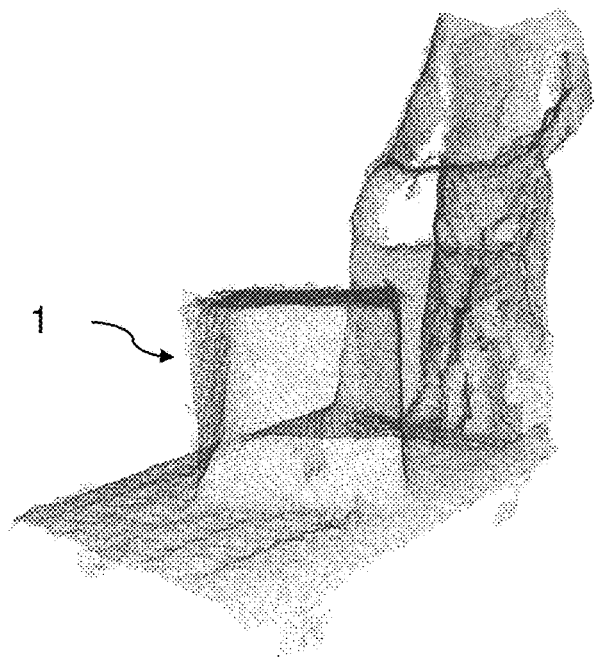
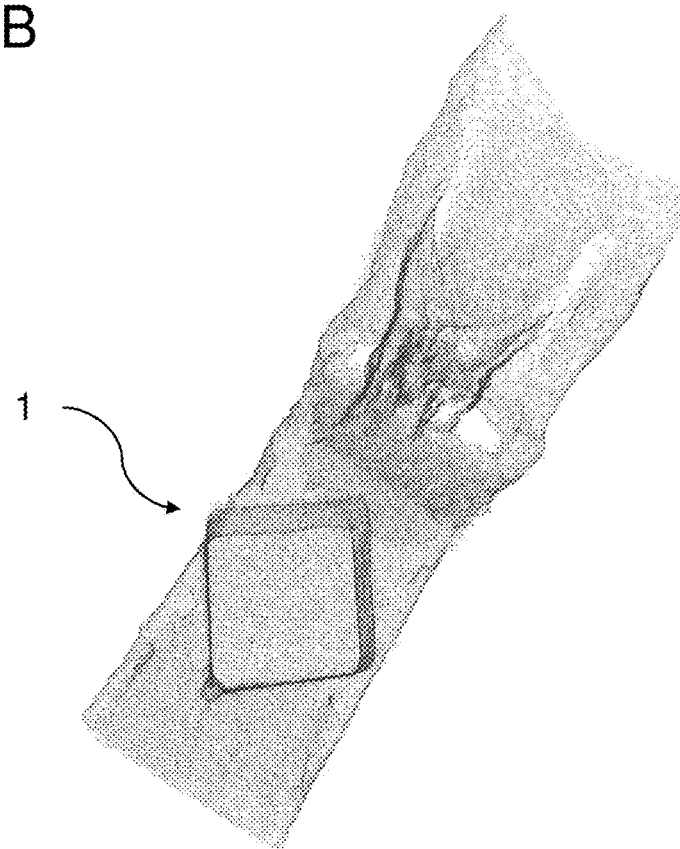

DEVICE AND METHOD FOR DETERMINING THE VOLUME OF AN OBJECT MOVED BY AN INDUSTRIAL TRUCK

CROSS-REFERENCE TO RELATED APPLICATIONS

This application is the U.S. National Phase Application of PCT/EP2015/001452, filed Jul. 15, 2015, which claims priority from DE 10 2014 011 821.5, filed Aug. 8, 2014, the contents of which applications are incorporated herein by reference in their entireties for all purposes.

BACKGROUND OF THE INVENTION

The invention relates to a device and a method for determining the volume of an object moved by an industrial truck.

In piece goods logistics, it is necessary to determine the freight volume and the volume of individual load items, respectively, so as to be able to determine the freight space required as accurately as possible. A known approach, but one that is inaccurate, is to estimate the freight volume of a delivery on the basis of a declared weight by way of an average goods density of the items. Furthermore there are measuring systems of known prior art, which require the object is measured to be stationary and freestanding; however, this leads to disadvantageous delays and interruptions in workflow, since, in logistics terminals or transhipment terminals in particular, the daily volume of freight must be ascertained in short time slots.

A need therefore exists for a measuring device, which enables the determination of the volume of the loaded goods without any interruption or changes to the logistics processes internal to the terminal. Such a volume-measuring device for moving objects is already of known art from EP 2 439 487 B1. For purposes of sensing the contour of loaded goods it is, for example, proposed to deploy four contour sensing sensors designed as laser scanners, which in each case scan the loaded goods that are being moved line-by-line, that is say, layer-by-layer as they pass by, and to image the received light beams on line-form image sensors, so that a view onto the loaded goods is ascertained in the form of strip images sensed one after another.

Such a line-based, or strip-based laser scanning method requires, however, that the individual scanned strip images of the moving loaded goods are reconstituted at the correct distance, i.e. taking into account the movement of the loaded goods in order to obtain an overall external contour of the loaded goods and the means of transport. Thus the sensed data must be laboriously reconstituted while detecting the movement of the loaded goods, a process that is cost-intensive and subject to errors. The reason for this lies in the fact that, depending upon the recording speed of the sensor, each image line per se is slightly delayed, since each pixel, that is to say, each point on the line, is recorded one after another. The distortion differs with varying, or fluctuating speeds of the loaded goods, and is also dependent on the distance of each point from the sensor. At the same speed, points that are nearer move further than points that are further away relative to the sensor. For the reconstitution of a single image the movement of the object must thus be ascertained and calculated. For this purpose a highly accurate odometry sensor is required, by means of which the movement is determined.

A further disadvantage of such a strip-based laser scanning method is the fact that while such laser scanners do enable a comparatively high resolution of a contour of the loaded goods, they are comparatively expensive.

A further device for determining the dimensions of loaded goods that are being moved is of known art from U.S. Pat. No. 7,757,946 B2, which has similar disadvantages to those described above. The patent document U.S. Pat. No. 8,599,303 B2 describes the build of a time-of-flight camera, which can be used for the optical sensing of the dimensions of an object that is being moved on a conveyor belt. Furthermore from U.S. Pat. No. 6,798,528 B1 a system for determining the dimensions of a moving object is of known art, which is used for the measurement of parabolic mirrors. What is disadvantageous here is the comparatively complex build and the difficulty, as a result of the measurement process, of being able to measure irregular objects accurately.

Thus it is an object of the invention to provide an improved device and an improved method for determining the volume of an object that is being moved by means of an industrial truck, with which the disadvantages of the conventional techniques can be avoided. In particular it is the object of the invention to provide a device for determining the volume of an object moved by means of an industrial truck, with which a reliable determination of the volume of the loaded goods that are being moved is made possible, without having to alter existing logistics processes internal to the terminal, or having to interrupt these for purposes of measuring the volume. A further object underlying the invention is to provide a device for purposes of determining the volume of an object moved by an industrial truck, which can be arranged in a cost-saving and space-saving manner in the domain of a loading terminal, in particular in the domain of a loading gate of a logistics terminal.

The said objects are achieved by means of a device and a method of the invention, and are explained in more detail in the following description, partially with reference to the figures.

SUMMARY OF THE INVENTION

In accordance with the prior art the inventive device for determining the volume of an object moved by an industrial truck has a sensor apparatus for purposes of sensing the shape of the surface of the object, together with a volume-determining apparatus, which is designed so as to create a 3-D model of the object on the basis of the sensed sensor data, and to determine the volume of the object on the basis of the 3-D model produced.

In accordance with general aspects of the invention the sensor device comprises a first depth image sensor and a second depth image sensor, which are arranged such that the object moved by the industrial truck can be sensed from two different directions as it passes through the passage region.

Furthermore the device is designed to produce a sequence of single images in a first resolution with each of the depth image sensors, wherein the sequence of single images shows the industrial truck and the object from different viewing angles as they pass through the passage region. By virtue of the movement of the object through the passage region a fixed visual cone of a depth image sensor thus senses different viewing angles onto the object over time.

The device also comprises a volume-determining apparatus, which in accordance with the invention is designed to subject the sequences of single images of the first depth image sensor and of the second depth image sensor in the first resolution to super resolution processing, in order to create a 3-D model comprising the industrial truck and the object in a second resolution that is higher than the first resolution, and to determine the volume of the object on the basis of the 3-D model produced.

Super resolution processing is a well-known technique from 2-D image processing, which can be transferred across to 3-D projects, wherein by means of sensing and image stacking, that is to say by the combination of data, in terms of time and place, of different single images of low resolution, on the basis of redundant and/or complementary image information contained in the images, an image with a higher resolution is produced.

A particular advantage of the invention thus lies in the fact that comparatively cost-effective depth image sensors of low resolution can be employed, since in accordance with the invention a 3-D model of higher resolution is produced from the low resolution sensor data, which resolution is higher than the intrinsic sensor resolution, so as to be able to execute a reliable and accurate determination of the object volume. Thus in the measurement principle proposed the movement of the object is not an aggravating factor that must be overcome, but rather an important part of the measurement, which is utilized so as to produce a high resolution model of the surface shape of the object.

A further advantage is that in accordance with the device as proposed, two depth image sensors, with which the object can be sensed from two different directions, are sufficient to produce the 3-D model, since the image sequences recorded by each depth image sensor show the object from varying viewing angles, so that a complete 3-D model can be produced by an appropriate recombination of the single images.

Similarly it is advantageous that a surface shape of the object that can currently be sensed by the visual cone of a depth image sensor can be sensed essentially at one point in time as a pixel image, that is to say, as a complete image, and not in the form of strip images recorded one after another. This increases the robustness with respect to any blurring of the object, since in this case a complete image "leaps out", and not just a strip, and since in comparison to a strip a complete image is easier to register.

It is particularly advantageous if the integration, i.e. the sensing and superposition of the data takes place by means of so-called truncated signed distance functions (TSDFs), since by this means measurement errors as a result of random deviations can be reliably corrected, and the integration of the data is optimal in terms of use of the method of least squares. Furthermore in this manner it is possible to avoid drifts.

The depth image sensors produce pixel images, wherein an item of distance information, that is to say, a distance value is ascertained for each pixel of a single image. The item of distance information is a measure for the distance of the point sensed on the surface from the depth image sensor. The depth image sensors that are used can, for example, operate in accordance with the structured light principle, the time of flight principle, or the stereovision principle. The depth image sensors operate in an analogous manner to video cameras, in that they "film" the object and the industrial truck as they pass through the passage region, wherein each single image of the depth image sensors shows a view from the recording direction onto the object and the industrial truck. Since the object, at least when it is being moved, moves past the depth image sensors, a subsequent single image from each sequence shows a slightly altered view onto the object and the industrial truck.

The object can, for example, be a shipment, or the goods loaded onto an industrial truck. The industrial truck can, for example, be a forklift truck, an electric lift truck, a low-lift truck, a high-lift truck, a hand pallet truck, an order-picking truck, a high-reach forklift truck, a platform truck, or similar. Furthermore the industrial truck can be a mobile transport container, which at least partially encloses the shipment being transported, for example a trolley, a wire mesh cart, or a wire mesh trolley. The passage region can be, for example, a loading gate, a loading passage, an industrial door, a garage door, an interior door, a loading bay, a tunnel, a portal, a marked path section, or in general terms, a region through which an industrial truck passes when transporting loaded goods in a predetermined direction of movement.

In accordance with a preferred configuration the two depth image sensors are arranged in the passage region such that a forward region, an upper region, a first lateral region and a second lateral region located opposite to the first lateral region, of a surface shape of the object and the industrial truck, can be sensed if the object passes through the passage region, wherein at least the first lateral region can be sensed with the first depth image sensor, and at least the second lateral region can be sensed with the second depth image sensor. The two depth image sensors are thus preferably positioned such that complementary lateral regions of the object being moved can be sensed with them in each case.

Particularly advantageous is an arrangement of the two depth image sensors, in which the latter are arranged and set up in the passage region such that the object being moved can be sensed obliquely from above. The visual cones of the said two depth image sensors are thus preferably aligned obliquely downwards, and are pivoted towards the end face of the industrial truck moving in the passage region. By this means each depth image sensor can preferably sense a front face, an upper face, and either a left-hand face, or a right-hand face, of the object in the passage region. The two depth image sensors can be arranged in the passage region such that the object, as it passes through the passage region, moves past below and between the two depth image sensors. This variant enables good protection of the sensors from damage during loading operations.

In particular the depth image sensors can be arranged such that they sense the object being moved obliquely from above and from the front, and such that the axes of the visual cones of the two depth image sensors are inclined towards one another.

It is furthermore particularly advantageous if a visual cone of at least one depth image sensor is designed such that a rear face of the object can be sensed for a short period as it passes through the passage region, at least as the object is exiting from the visual cone. In this manner a rear edge of the object can also be sensed, at least in some images of the image sequence. If the sensed object is, for example, sensed obliquely from above by means of the depth image sensors, this can be achieved if at least one line on the surface of the visual cone intersects with a vertical.

In the context of the invention the possibility also exists, however, of aligning the two depth image sensors straight downwards, so that the object is sensed straight down from above, or for the two depth image sensors to be arranged on opposite sides of a passage region, such that the visual cones are aligned at right angles to the direction of movement of the object and are facing one another.

In the context of the invention the possibility also exists, however, of arranging and aligning a first depth image sensor in the passage region such that the object can hereby be sensed obliquely from above and from the front, and for the second depth image sensor to be aligned straight downwards, so that the object is sensed vertically from above as it passes through the passage region. In accordance with a variant of this possible arrangement the first depth image sensor is preferably arranged on a lateral upper edge of the passage region such that the object, as it passes through the passage region, is not moved directly underneath past the first depth image sensor, but rather laterally, that is to say, laterally underneath the latter, while the second depth image sensor is preferably arranged centrally above in the passage region, with the visual cone vertically downwards.

An advantageous configuration of the invention envisages that by ascertaining elements that have moved in the image sequences the volume-determining apparatus is designed so as to determine a region of interest (RoI) comprising the industrial truck and the object, for which region the super resolution processing is executed. In this manner the movement of the object can advantageously be utilized so as to separate the object and the industrial truck from the background to the image, and to limit the super resolution processing to just these image regions.

Moving elements can, for example, be ascertained on the basis of those pixel regions for which an item of distance information alters relative to a predecessor image, or relative to a background image, or an empty image, that is to say, an image that does not contain the industrial truck and the object. If, for example, a distance value of a pixel in one single image alters in a sudden manner in the following single image in the image sequence, for example, if the difference of the distance values of the corresponding pixels in the image and the predecessor image, or background image, exceeds a prescribed threshold value, this can be used for purposes of identifying a moving subject in the image.

In an advantageous variant of this configuration the volume-determining apparatus is designed to be used for determining the region of interest for only those moving elements that exceed a predetermined minimum size, and/or move along a prescribed direction or trajectory. By this means, for example, small objects, or objects moving in the background of the image, which in general do not move along the anticipated trajectory of the industrial truck, can be identified and filtered out reliably. Here it is to be noted that the industrial truck, and with it the object that is being moved with the industrial truck, moves in the passage region in accordance with a predetermined direction of movement, for example along the prescribed direction of transport for purposes of passing through a loading gate.

Particularly advantageously the super resolution processing is to be designed such that firstly data from the sequence of single images of the first depth image sensor are combined in time, and data from the sequence of single images of the second depth image sensor are combined in time, and the time-wise combined image data of the first depth image sensor are then spatially combined with the time-wise combined image data of the second depth image sensor. This sequence increases the accuracy of the resulting 3-D model, since the spatial combination is more complex, and provides better results, the better the initial data.

In the context of the invention the possibility also exists, however, of firstly spatially combining corresponding single images from the image sequence of the depth image sensors, and then combining the spatially combined image data in terms of time. In accordance with both variants the super resolution processing thus produces a three-dimensional point cloud of the industrial truck and the object, from which a 3-D model can then be determined.

In accordance with a further aspect of the invention the volume-determining apparatus is designed so as to supplement and/or to correct image information that is missing or subject to error in the single images in the super resolution processing when creating the 3-D model. The superposition of the plurality of single images of the object and the industrial truck that are created by the depth image sensors as they pass through the passage region, thus enables, in addition to the advantageous effect of an increase in resolution, the additional delivery of image information in parts of the single images that is missing or subject to error. Image information that is not present or subject to error can additionally be provided by other single images from the sequence, in which the relevant information is contained for the sub-region that is missing or subject to error. By this means both random errors and also missing measured data can be corrected. The latter requires that the relevant image information concerning the surface sub-section of the object is contained in at least one depth image.

In order to determine the volume of the object on the basis of the 3-D model produced, it is necessary to separate the object from the industrial truck in the 3-D model, so that the surface shape of the object can be ascertained.

Here a possible variant envisages that the volume-determining apparatus is designed to use a predetermined labelling on the industrial truck at a point that cannot be concealed by the object, for purposes of differentiating between the object and the industrial truck.

The labelling can, for example, be designed in the form of strips, which is conducive to reliable detection. Furthermore the volume-determining apparatus can be set up so as to determine a vertical movement of the object relative to the industrial truck with the aid of the sensed labelling. From practice it is known that a vertical position of moving loaded goods can alter as they pass through the passage region, e.g. as a result of the rise or fall of the lifting forks of a forklift truck. Such a vertical movement of the object can reliably be ascertained by a comparison of the distance of an upper edge of the object from the fixed labelling. When assembling the image sequences in the course of the super resolution processing, the vertical movement thus sensed can be used as a correction factor.

The labelling can be applied laterally relative to the direction of travel on a lift mast of the industrial truck, if the industrial truck for example is designed as a forklift truck. Furthermore labelling on the lift mast offers the advantage that the volume-determining apparatus can be set up so as to determine any inclination of the lift mast with the aid of the sensed marking. An inclination of the lift mast determines a corresponding inclination of the lifting forks, which define a base plane for the object. The inclination of the lifting forks, that is to say, of the base plane, therefore determines a corresponding inclination of the object, that is to say, the loaded goods that are stored on the lifting forks, that is to say, the base plane. An inclination sensed in this manner can thus be used as a correction factor in the creation of the 3-D model, in order to increase the accuracy. In particular the volume-determining apparatus can be set up with the aid of the inclination determined for the lift mast so as to determine a demarcation plane parallel to the lift mast, together with the base plane of the loaded goods at right angles to the latter, that is to say, the inclination of the base plane, wherein the demarcation plane and the base plane bound the possible location of the object.

The demarcation plane contains the lift mast of the industrial truck, or has a predetermined separation distance from the latter, which can be specifically prescribed for the industrial truck. The separation distance specifies the smallest possible distance of the object from the lift mast. The demarcation plane thus defines a bounding plane, which represents a boundary for the possible location of the object, since the object, for example, is always located ahead of the lift mast. A demarcation plane determined in this manner can thus be used to identify the object in the region of interest in order to demarcate reliably the surface shape of the object from the surface shape of the industrial truck.

In accordance with a further aspect of the invention the device can have a synchronized RGB camera for purposes of detecting the labelling of the above-cited design variants. This is synchronized in the sense that the viewing angle, the aperture angle and the image rate of the RGB camera are in agreement with the depth image sensor.

An alternative design variant for purposes of demarcating the object from the industrial truck in the 3-D model produced envisages that the device is designed to sense a sequence of single images of the unloaded industrial truck as it passes through the passage region. This can take place during an outward or a return journey of the industrial truck, depending upon whether a loading or unloading process is taking place. For example, the device can sense the industrial truck during the return journey through the passage region, after the industrial truck has offloaded its load. The volume-determining apparatus can then be designed to determine on the basis of the said sequence of single images a surface shape of the industrial truck without an object, which is used for purposes of demarcating a surface shape of the object from the surface shape of the industrial truck in the 3-D model. This design variant offers the advantage that no additional markings or databases with the models of the industrial trucks are necessary.

In accordance with a further form of embodiment the device can also comprise a database in which are stored 3-D models of various industrial trucks. Here the volume-determining apparatus is designed so as to demarcate the surface shape of the object from the surface shape of the industrial truck, in order to determine the surface shape of the industrial truck in the 3-D model by means of the stored 3-D models and prescribed identification features. The prescribed identification features can, for example, be certain edges, corners or other characteristic features of the industrial truck, which as a general rule are not concealed by the shipment, and which are searched for in the image data in order to determine the type of the industrial truck and then to read out the surface shape stored in the database for this type.

It has already been mentioned above that the industrial truck can be a mobile transport container, which at least partially encloses the shipment that is being transported, for example, a trolley, a wire mesh cart, or a wire mesh trolley. In accordance with this form of embodiment the determination of the volume of the shipment can be used to determine the fill level of the trolley or wire mesh cart.

Here the 3-D model is again used so as to be able to demarcate the shipment from the industrial truck, wherein to this end it is not necessary to subtract the industrial truck from the scene in order to determine the volume of the shipment from its remaining surface shape. Instead it can be sufficient to identify the transport container, here a trolley or a wire mesh cart, with the aid of the 3-D model, and to separate it, that is to say, to demarcate it, from the shipment. For purposes of determining the volume either the length, height and width and thus the volume of the shipment can be determined and outputted, or alternatively a percentage value compared with the size of the transport container, i.e. the capacity utilization or fill level of the transport container, can be determined and outputted. An example of an application could be a wire mesh cart and/or a trolley, with which a multiplicity of letters, packages and/or goods consignments are transported as the shipment.

It has already been mentioned above that the depth image sensors can be arranged in the passage region such that the object being moved with the industrial truck can be sensed obliquely from above. The first depth image sensor and the second depth image sensor can, for example, be arranged at a height of 2 to 4 meters, more preferably at a height of 2.5 to 3 meters above the floor, and/or spaced apart from one another by 2.5 to 4 meters transverse to the direction of movement of the object in the passage region. In the context of the invention it has been established that such an arrangement of the depth image sensors on the one hand enables particularly reliable sensing of the surface shape of the object and the industrial truck, and furthermore any unintentional damage caused by the industrial truck as it travels past can be avoided.

In accordance with a particularly advantageous design variant for purposes of producing depth image data just two depth image sensors are provided, which are used for purposes of creating the 3-D model of the object, so that no further depth image sensors are necessary for purposes of sensing the surface shape.

However, in accordance with a further design variant one or two additional depth image sensors can be arranged in a lower section of the passage region. In particular if the moving object is sensed with the first and the second depth image sensor obliquely from above, such additional depth image sensors offer the advantage of particularly accurate sensing of the lower edge of the object.

Alternatively an additional depth image sensor can also be arranged such that it senses the moving object from above and is essentially aligned vertically downwards. A depth image sensor aligned in this manner can reliably sense a rear edge and/or rear face of the object, and can thus improve the accuracy of the 3-D model produced.

The invention further relates to a method for determining the volume of an object moved by an industrial truck, comprising the steps: (a) Arrangement of a first depth image sensor and a second depth image sensor in a passage region of the moving object such that the object, as it passes through the passage region, can be sensed from two different directions; (b) Production of a sequence of single images in a first resolution with each of the depth image sensors, which show the industrial truck and the object from different viewing angles as they pass through the passage region; (c) Production of a 3-D model comprising the industrial truck and the object in a second resolution, which is higher than the first resolution, by executing super resolution processing on the basis of the sequence of single images in the first resolution of the first depth image sensor and the second depth image sensor; and (d) Determination of the volume of the object on the basis of the 3-D model produced.

To avoid repetitions features disclosed purely in connection with the device should also be considered as disclosed in accordance with the method, and should be claimable.

BRIEF DESCRIPTION OF THE DRAWINGS

Other details and advantages of the invention are described in what follows with reference to the accompanying figures.

Here:

FIGS. 9A and 9B show a 3-D model after spatial integration in the super resolution processing;

DETAILED DESCRIPTION OF THE INVENTION

Figure 1:
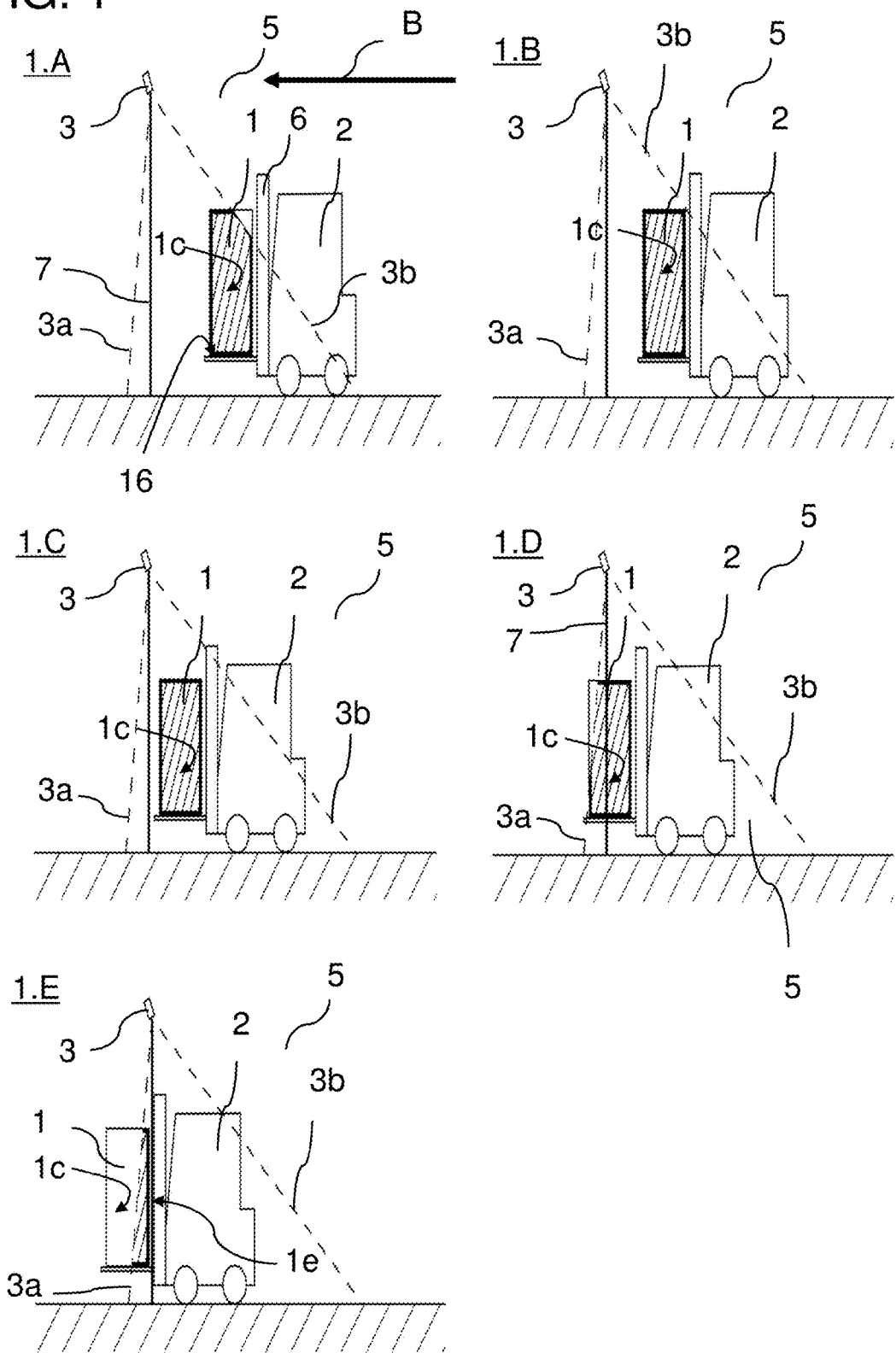
FIG. 1 shows side views to illustrate the sensing by means of two depth image sensors of an object moved by an industrial truck as it passes through a passage region.

FIG. 1 illustrates an industrial truck 2 and loaded goods 1 moved by the latter as they pass through a passage region 5, and the sensing of the moving loaded goods 1 by means of two depth image sensors 3, 4.

Figure 2:
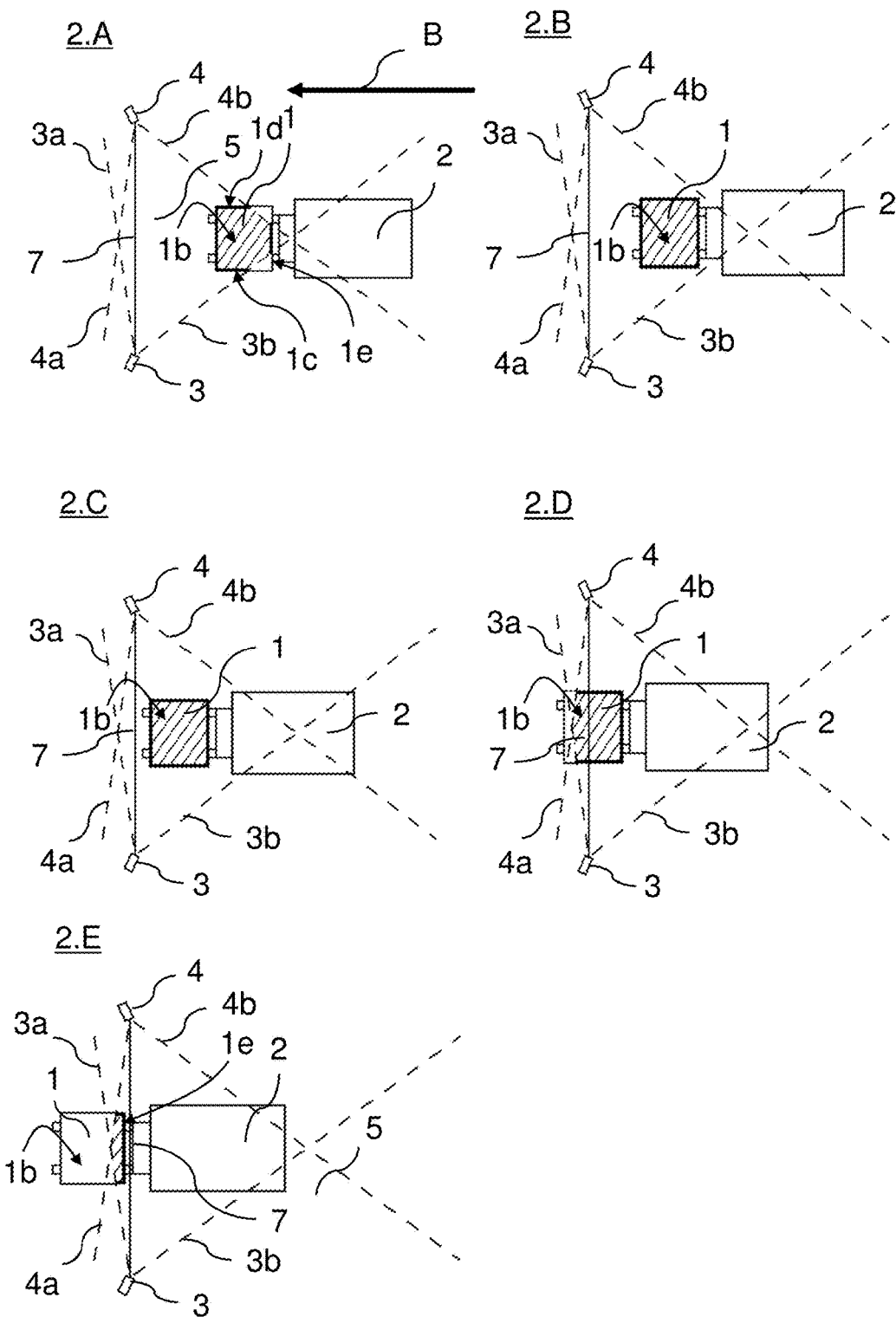
FIG. 2 shows each of the illustrations of FIG. 1 in a plan view.
Figure 3:
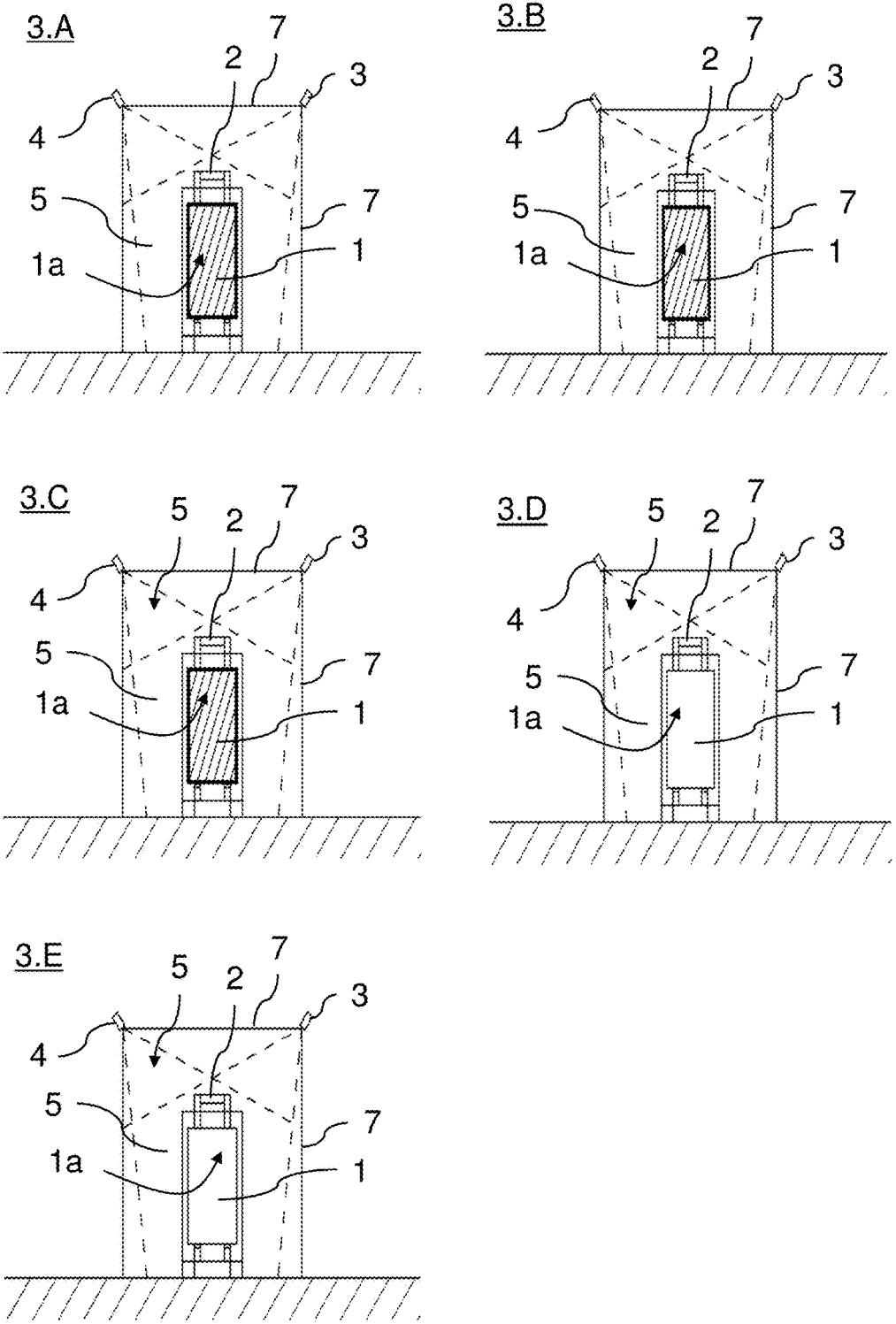
FIG. 3 shows each of the illustrations of FIG. 1 in a frontal view.

Here the sub-FIGS. 1.A to 1.E illustrate various positions of the loaded goods 1 and the industrial truck 2 as they pass through the passage region 5. FIGS. 2 and 3 show positions of the industrial truck 2 and the loaded goods 1, corresponding to those in FIG. 1, in plan views and in frontal views. Here components with the same reference symbols correspond to the components in FIG. 1 and are not separately described.

In the present example the industrial truck 2 is a forklift truck, on whose lifting forks the loaded goods 1 are transported. A loading gate 7 of a logistics terminal is identified as an example with the reference symbol 7. The passage region comprises the region ahead of and shortly behind the loading gate 7. The arrow identified with B specifies the normal direction of travel of the loaded industrial truck 2 in the passage region. However, in practice it is also possible for a loaded industrial truck to move in the direction opposed to B, for example, if the industrial truck travels backwards through the passage region for purposes of unloading a heavy goods vehicle or a container, wherein the end face of the industrial truck is again on the side facing towards the sensor arrangement. The device can thus be set up both for loading processes, in which the industrial truck typically travels forwards through the passage region, and also for unloading processes, in which the industrial truck typically travels backwards through the passage region, so as to sense the industrial truck with the depth image sensors, and to determine the volume of the object transported with the volume-determining apparatus.

For purposes of sensing the surface shape of the loaded goods 1 and the industrial truck 2 two depth image cameras 3, 4 are mounted in the upper region of the loading gate 7. The distance from the floor of the two depth image cameras 3, 4, which are mounted at the same height, is approx. 2.5 to 3 meters. Transverse to the direction of travel B of the industrial truck 2 the depth image cameras 3, 4 are spaced apart by approx. 3 meters. The depth image cameras 3, 4 are aligned such that the loaded goods 1 and the industrial truck 2 can be sensed obliquely from above, as characterized by the dashed lines, which identify the visual cone 3a, 3b of the depth image camera 3 and the visual cone 4a, 4b of the depth image camera 4 respectively.

The viewing angle of the depth image cameras 3, 4 is thus obliquely forward and obliquely downward. From FIG. 2 it can furthermore be seen that the visual cones are pivoted towards one another.

The aperture angle of the visual cones is, for example, approx. 60 to 90 degrees. Here the visual cones of the depth image cameras 3, 4 are furthermore aligned such that a rear face 1e of the loaded goods 1 can be sensed for a short period as it passes through the loading gate 7, at least as the loaded goods 1 are again exiting from the visual cones. This is represented in FIGS. 1.E and 2.E. The generator line, 4a and 3a respectively, lies behind the vertical plane of the loading gate 7, and thus impinges on a rear face 1e of the loaded goods 1 as they pass through the loading gate 7. With the present sensor arrangement of just two depth image cameras 3, 4 the rear face of the loaded goods 1, insofar as it is not concealed, can therefore also be sensed, if only in a few single images, so as to obtain a complete view of the object. Each of the depth image cameras 3, 4 can thus sense a front face, an upper face, a side view, and a rear edge or rear face of the loaded goods 1.

The depth image cameras 3, 4 are pixel cameras and can, for example, operate in accordance with the so-called structured light principle, or the time of flight principle, or the stereo vision principle. The depth image cameras 3, 4 determine, for each pixel of the pixel matrix, a distance value between the loaded goods 1 and the sensor plane. Current depth image cameras of this type have, for example, resolutions of 160×120 pixels, 320×240 pixels, or 640×480 pixels, for each single image.

As an industrial truck enters into the passage region 5 the loaded goods 1 and the industrial truck 2 are filmed by each depth image camera 3, 4 with a prescribed image rate, for example with an image rate of 30 images per second (frames per second (fps)), which produces a video stream of depth images.

As can be seen from FIGS. 1 to 3, the first depth image sensor 3 is aligned such that a forward region 1a, an upper region 1b, and a first lateral region 1c of the loaded goods, together with corresponding regions of the industrial truck, can be sensed as they pass through the passage region 5. Depending upon the position of travel of the industrial truck 2, that is to say, depending upon how far the industrial truck and the loaded goods 1 are located within the visual cone of the depth image camera 3, the front face, the upper face, and the lateral region are sensed completely, or only partially. This is illustrated in an exemplary manner in FIGS. 1 to 3 for the loaded goods 1 by the hatched area, which in each case identifies that part of the surface shape of the loaded goods 1 that is currently located within the visual cone of the depth image camera 3.

In an analogous manner the depth image camera 4 senses the lateral region 1d that is located opposite to the lateral region 1c, once again with the front face 1a and the upper face 1b, or, depending upon the position of travel, once again senses only sub-regions in each case (cf. FIGS. 2 and 3).

By virtue of the above-cited filming of the object 1 that is being moved by the industrial truck 2 each of the depth image cameras 3, 4 generates a sequence of single images in an inherent resolution for these depth image cameras 3, 4 (first resolution). Such a resolution for the currently available depth image cameras lies in a range of approximately +/−100 mm, which is initially insufficient for a reliable determination of volume.

The image data recorded by the depth image cameras 3, 4 are forwarded to a volume-determining apparatus, and are further processed there, which process will be explained in more detail in what follows.

Figure 4:
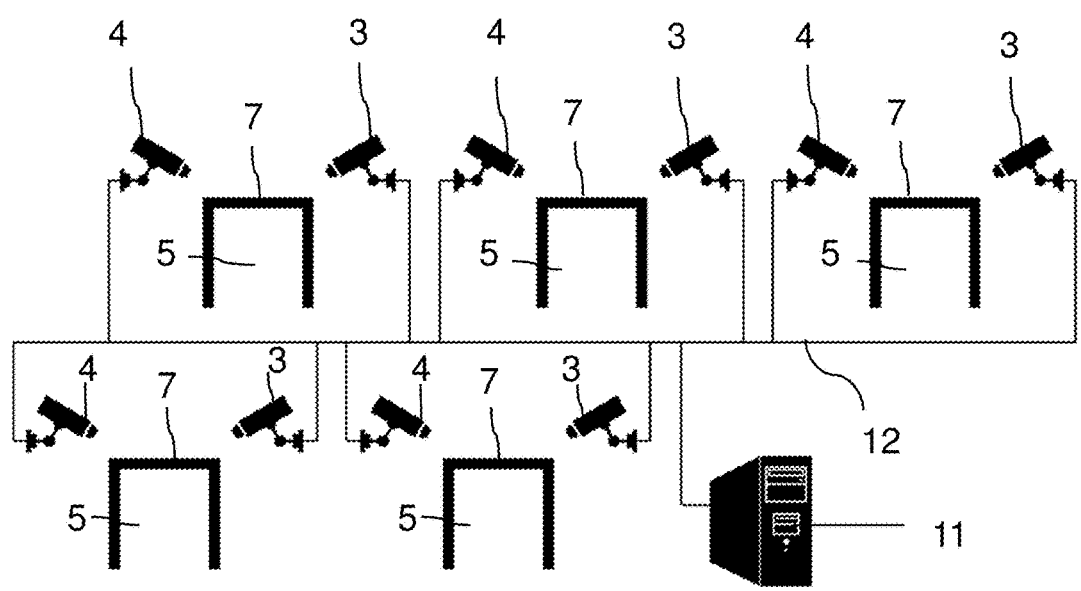
FIG. 4 shows a device for determining volume in accordance with one configuration.

FIG. 4 shows a form of embodiment of an inventive device 10 for purposes of determining volume. Here two depth image cameras 3, 4 are arranged on each loading gate 7 of a loading terminal, as has been described above with respect to FIGS. 1 to 3. The sequences of image data sensed by the depth image cameras 3, 4 are sent by way of appropriate communications lines 12 to a central volume-determining apparatus 11 and processed. The central volume-determining apparatus 11 can be a conventional computer, which is equipped in terms of programs for processing the depth images of the depth image cameras 3, 4 for purposes of determining volume.

The execution of the determination of volume by means of the volume-determining apparatus 11 is explained with the aid of the examples in the following figures.

Figure 5:
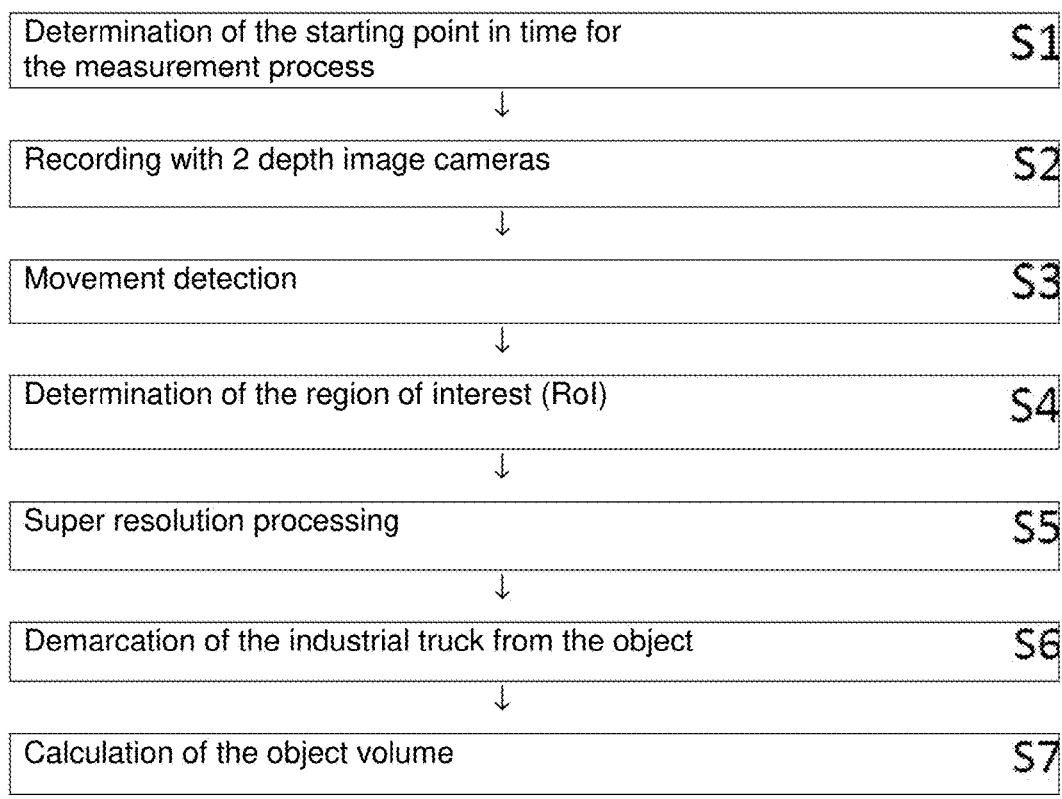
FIG. 5 shows a flow chart of the method for determining volume.

FIG. 5 describes in a flow chart the steps for determining the volume of loaded goods 1 moved by an industrial truck 2.

In step S1 the starting point in time for a measurement process conducted by the depth image cameras 3, 4 is determined. Here a measurement process (step S2) is initiated, if the industrial truck 2 and the loaded goods are approaching the visual cones of the depth image cameras 3, 4, or enter into the latter. This can, for example, be implemented by means of a light curtain, which is arranged a short distance ahead of the visual cones transverse to the direction of movement B. Alternatively the starting point in time can determined by means of a wireless solution, a barcode scan, or by entry into a predefined region of the passage region 5. In addition images can be buffered until a starting point in time is determined, so as then still to be able to retrieve the older images.

In step S2 the industrial truck 2, together with the loaded goods 1 transported with the latter, are then filmed with the two depth image cameras 3 and 4 as they move through the passage region 5, wherein each depth image sensor 3, 4, as described above, generates a sequence of individual depth images at a predefined image rate and resolution, which show the industrial truck 2 and the loaded goods 1 from different viewing angles as they pass through the passage region. After the industrial truck 2 has again exited the visual cone of the depth image cameras 3, 4, the recorded sequences of image data are transmitted to the volume-determining apparatus 11, which processes the transmitted image data further (steps S3 to S7).

In step S3 the volume-determining apparatus executes a movement detection process. In the movement detection process the loaded goods 1 that are to be measured, in combination with the industrial truck 2, are demarcated from the image background. For this purpose moving objects are investigated in the individual pixel images and are classified as important for the determination of volume. Moving objects are distinguished by the fact that the pixels associated with the object have distance values that alter suddenly relative to the previous image. Alternatively the alteration of the distance values can be ascertained based on a background image, i.e. a camera image without the industrial truck or loaded goods.

Here the only objects selected are those that have a predetermined minimum size and move in an expected trajectory direction, corresponding to the direction of movement B, so as to improve the robustness of the method with respect to outliers or measurement errors.

Figure 6:
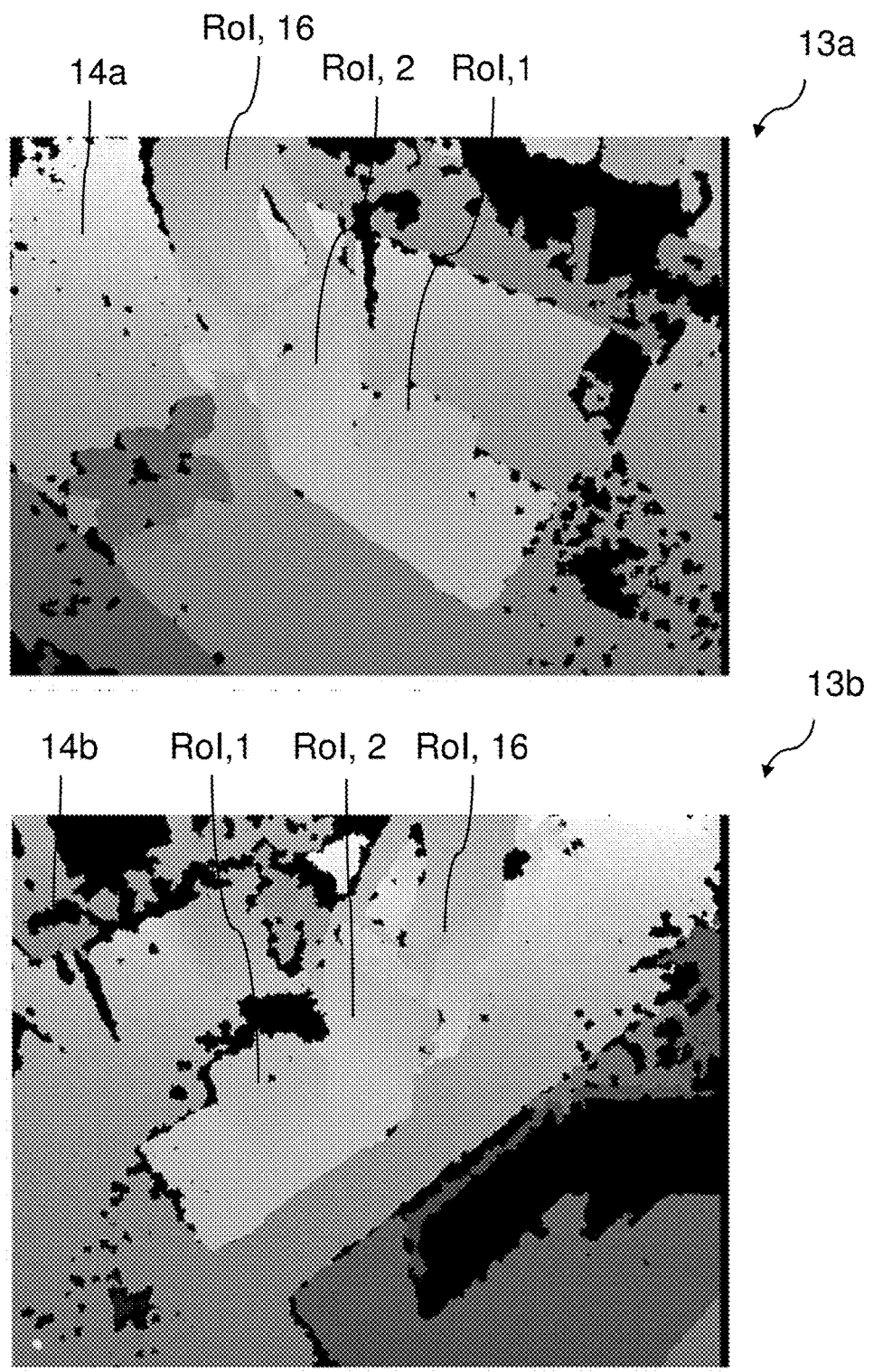
FIG. 6 shows the determination of a region of interest containing the industrial truck and the object in single images.

In step S4 the moving objects thus ascertained are defined in the single images as a region of interest (RoI), which comprises the industrial truck 2 and the object 1. This is represented in an exemplary manner in FIG. 6. The upper FIG. 13a shows an image of a depth image sensor in which the region of interest (RoI) has been marked accordingly. The region of interest (RoI) contains a platform truck as an example of an industrial truck 2, the loaded goods 1 transported on the latter in the form of a package, together with a person 16 who is pushing the platform truck 2. The other regions 14a are not relevant in the determination of the volume of the loaded goods 1. The lower FIG. 13b shows the corresponding single image from the sequence of the other depth image sensor. It is difficult to demarcate the region of interest RoI, 1 of the package 1 transported on the platform truck in the grey image representation of FIG. 6 from the region of interest RoI, 2 of the platform truck, since both subjects have similar distance values from the depth image sensor and are thus similarly colored.

This region of interest RoI is taken as a basis for subsequent processing, in particular for subsequent super resolution processing.

Thus a particular advantage of this movement detection is that the object movement is advantageously used in order to demarcate important image data from unimportant image data, so that the following processing steps can be executed only for the identified region of interest of the image data.

Figure 7:
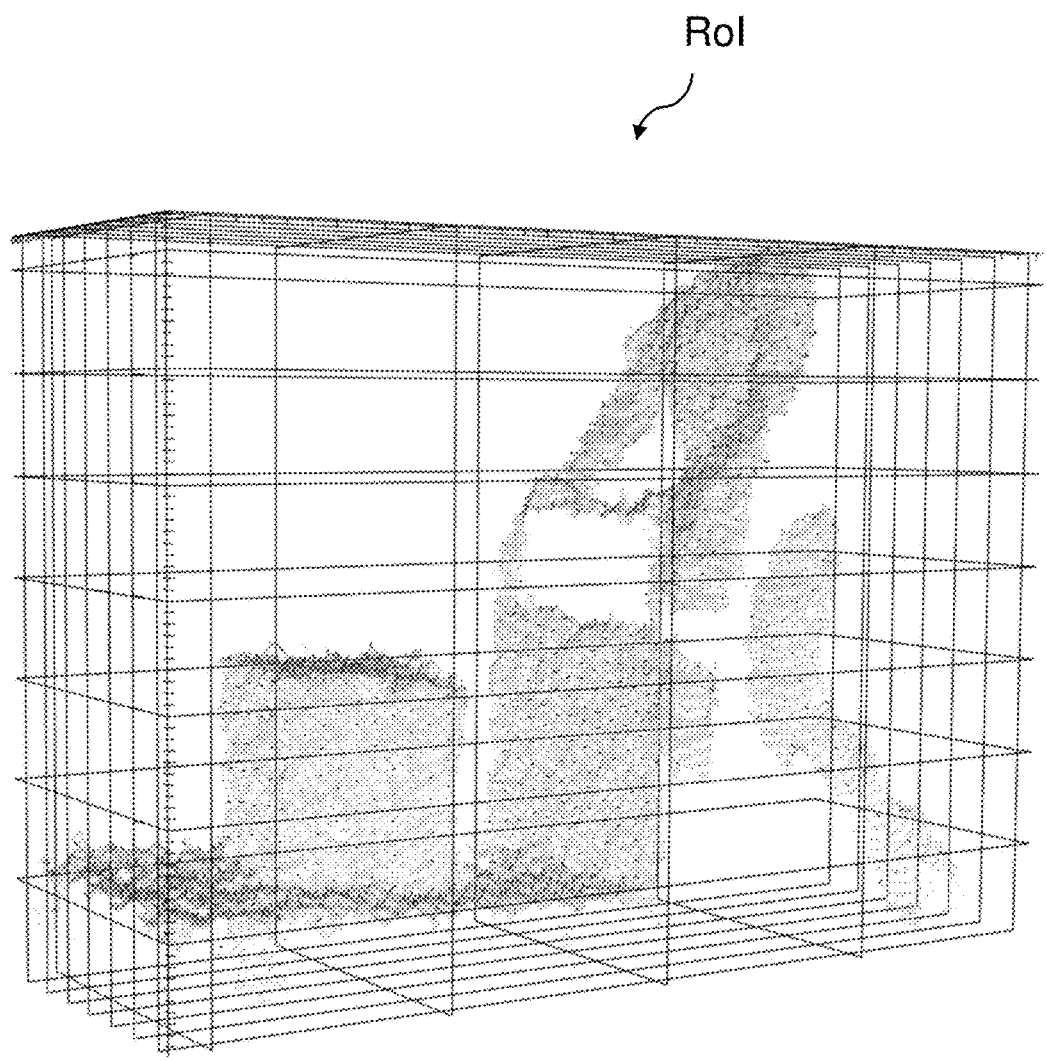
FIG. 7 shows an illustration of the region of interest in world coordinates.

The RoI image data that have been classified as relevant in the course of movement detection, and as part of the region of interest, are then transformed from image coordinates into world coordinates. This is illustrated in FIG. 7, such that a three-dimensional point cloud is generated after this transformation.

The geometry of the point coordinates is then analyzed so as to check whether the known geometry of the industrial truck, e.g. of the platform truck, can be contained in the measured point cloud.

In step S5 super resolution processing is then executed for the image data of the identified region of interest, so as to achieve, by combination of the single images of poor resolution, a resultant 3-D point cloud, that is to say, a 3-D model with a greatly improved resolution that is higher than the intrinsic sensor resolution.

Such super resolution processing is known per se in the field of image processing, wherein initial image data of low resolution are registered and superimposed, i.e. are combined both in terms of time and space. This describes the superposition of depth images that are displaced in terms of time and/or space.

Figure 8:
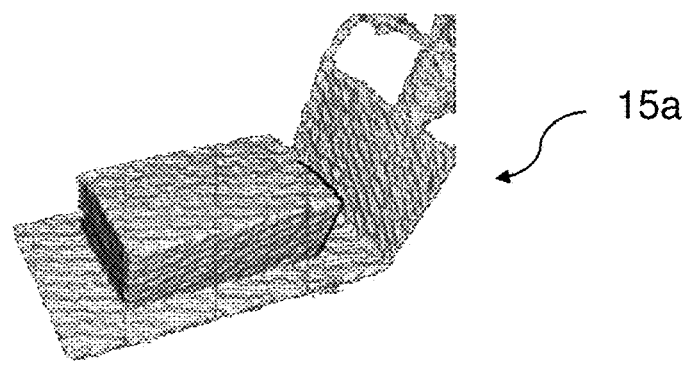
FIG. 8 shows a 2.5D-model during individual steps of time-wise integration in the super resolution processing.
Figure 8:
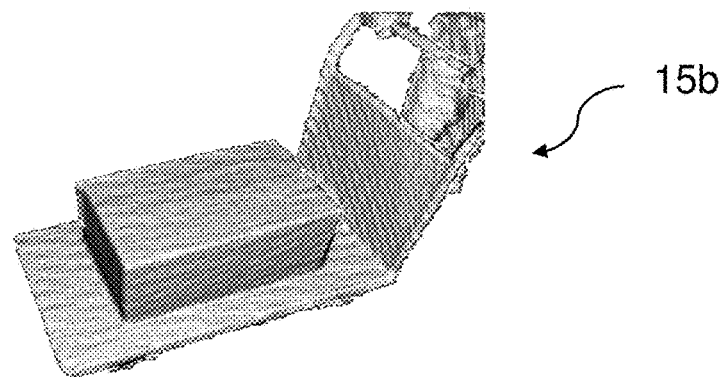
Figure 8:
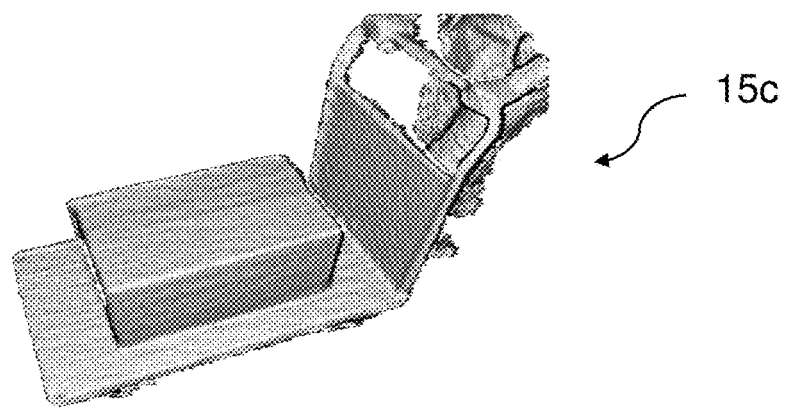

Here it is particularly advantageous firstly to combine the data from the first depth image camera 3 together with the data from the second depth image camera 4 in terms of time. In the course of the combination of data in terms of time the depth images from each sensor are integrated. By this means the information content is increased by virtue of the moving object, since the visible regions alter over time as a result of self-concealment. This is illustrated in FIG. 8.

FIG. 15a shows the 2.5D model after the time-wise integration of a depth image. FIG. 15b shows the 2.5D model after the time-wise integration of five depth images, and FIG. 15c shows the 2.5D model after the time-wise integration of 15 depth images, as a result of which the resolution is increased in steps. By this means the resolution of the final result can, for example, be better by a factor of 5 than that of the intrinsic sensor resolution.

The two 2.5D models of the two depth image sensors are then combined in terms of space by the volume-determining apparatus. From this a 3-D model or a point cloud of the industrial truck and the object is generated. This is illustrated in FIGS. 9A and 9B, which show a 3-D model 17, comprising the platform truck, the person pushing the platform truck, together with the loaded goods 1 transported with the platform truck.

In addition by means of the superposition of many single images information that is not present in the parts of the images (empty parts of the images) is subsequently supplied by other single images, which contain information concerning the sub-region. By this means on the one hand random errors, and also missing measured values, can be corrected. The latter requires that the corresponding surfaces are contained in at least one depth image.

In step S6 there then takes place, on the basis of the 3-D model 17 produced, a demarcation of the industrial truck 2, and if necessary, the person operating the industrial truck, from the object 1. In what follows some advantageous design variants are outlined in this respect.

A first possibility is that the volume-determining apparatus 11 comprises a database, in which 3-D models of various industrial trucks are stored. Such a database can, for example, be generated in that an industrial truck without a shipment is driven one or a number of times through the measuring region and the resultant point cloud of the industrial truck generated on the basis of the depth images is stored with a unique code identifying the industrial truck. The code for the industrial truck can then be ascertained for the actual measurement by way of an RFID, barcode, or another wireless solution, and can be transferred to the volume-determining apparatus, which then reads out the point cloud previously stored in the database for the code. With the aid of the said point cloud that has been read out the corresponding point cloud in the region of interest is determined in order to demarcate the loaded goods from the industrial truck.

Alternatively the volume-determining apparatus 11 can also be designed so as to determine the surface shape of the industrial truck in the 3-D model generated by means of the 3-D models and prescribed identification features stored in the database, without the need for transmitting an identification code for the industrial truck.

Furthermore the possibility exists of applying an optical marker or labelling to the industrial truck 2, which is sensed by means of an additional RGB camera, which is provided in the passage region. A particularly advantageous variant envisages that strip-type labelling is employed, which can, for example, be one meter in length, and is designed to be black/white, black/white/black, or black in combination with a retro-reflector.

This is applied laterally vertically on the lift mast, for example, of a forklift truck with a clearly defined separation distance from the demarcation plane, i.e. a plane that is parallel to the lift mast and at which shipment can begin at the earliest. With the aid of the labelling the industrial truck can be reliably identified and differentiated from the loaded goods.

After the industrial truck has been identified by means of one of the above-cited methods, the industrial truck and thus its geometry are known and can accordingly be localized in the point cloud.

Subsequently the loaded goods are demarcated from the industrial truck, that is to say, the points of the point cloud that do not represent the loaded goods are removed.

Figure 10:
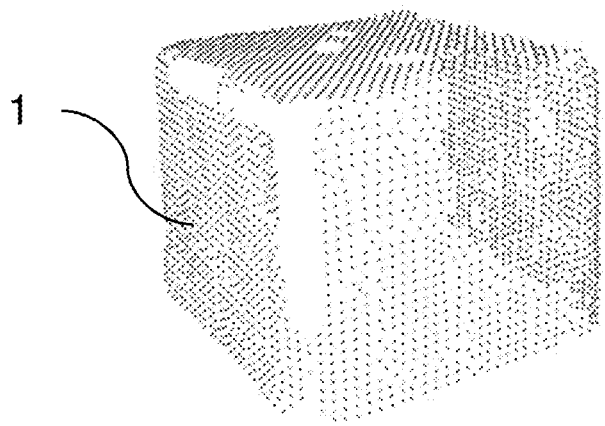
FIG. 10 shows a 3-D model after demarcation from the industrial truck.

The three-dimensional point cloud of the load is then completed to form a 3-D model of the loaded goods 1. This is illustrated in FIG. 10, which shows an example of a 3-D model 18 of the loaded goods 1.

In step S7 the object volume is then calculated, the method for which is known per se from the prior art. Here, for example, a search is made for the smallest cuboid that encloses all the loaded goods, that is to say, encloses all the corresponding point cloud.

For the above-cited super resolution processing various super resolution methods known from the prior art can be employed per se. In what follows just one particularly advantageous design variant for purposes of executing the step S5 is described in detail as an example.

In the course of the data combination the depth images of each sensor are integrated, i.e. registered and superimposed—these are methods that are also known by the English specialist terms of "image registration and image stacking". Integration takes place by means of so-called truncated signed distance functions (TSDFs). Here these take the form of a voxel lattice, whose voxels store two values—the distance to the next surface along the line-of-sight beams of the sensor F(p) together with a weighting W(p). The distance is signed; as viewed from the sensor positive distances are located in front of a surface, negative distances are located behind. The weighting W(p) corresponds to the confidence and is inversely proportional to the object distance and to the angle between the line-of-sight beams and the normal vectors of the surfaces. The transformation from a depth image into a TSDF takes place by means of projection of the voxel coordinates p onto the image plane.

Integration by means of TSDFs has two main advantages compared with other methods. Firstly measurement errors as a result of random deviations are reliably corrected by this means, since integration of the data is optimal in terms of least mean squares errors. Secondly it is possible in this manner to avoid drifts, which, for example, occur in the course of an incremental pair-wise registration of point clouds, and can have a negative influence on the end result.

The integration of the information of a depth image $D_k$ into the global 3-D model takes place by a combination of the corresponding TSDFs Tk of the single images with the global TSDF T. Since the object position always alters in the single images of the image sequence, compensation for this effect must firstly be made. To this end the relevant regions of Dk are transformed into a point cloud. A further point cloud, which is synthesized from T by means of so-called raycasting, serves as a reference. The displacement of the object at the point in time k is ascertained by the registration of these point clouds. For purposes of registration the largest common point set (LCP) algorithm of known art is used. After the correction of the object displacement, Tk and T overlap, and can be combined by means of a weighted averaging of the voxels.

For purposes of initialization of T the particular depth image is used that shows the relevant objects in their entirety and from the least distance to the sensors. The above steps are then executed for each depth image that is to be integrated. The point cloud then synthesized from T corresponds to the combined information.

Regarding further details of the integration by means of so-called truncated signed distance functions (TSDFs) reference is made to the following literature: P. J. Besl and Neil D. McKay. "A method for registration of 3-D shapes". IEEE Trans. Pattern Analysis and Machine Intelligence 14.2 (1992), pp. 239-256; Brian Curless and Marc Levoy. "A volumetric method for building complex models from range images". Proceedings of the 23rd Annual Conference on Computer Graphics and Interactive Techniques. ACM. 1996, pp. 303-312; and also Richard A Newcombe and others "KinectFusion: Real-time dense surface mapping and tracking". 10th IEEE International Symposium on Mixed and Augmented Reality (ISMAR). IEEE. 2011, pp. 127-136.

Figure 11:
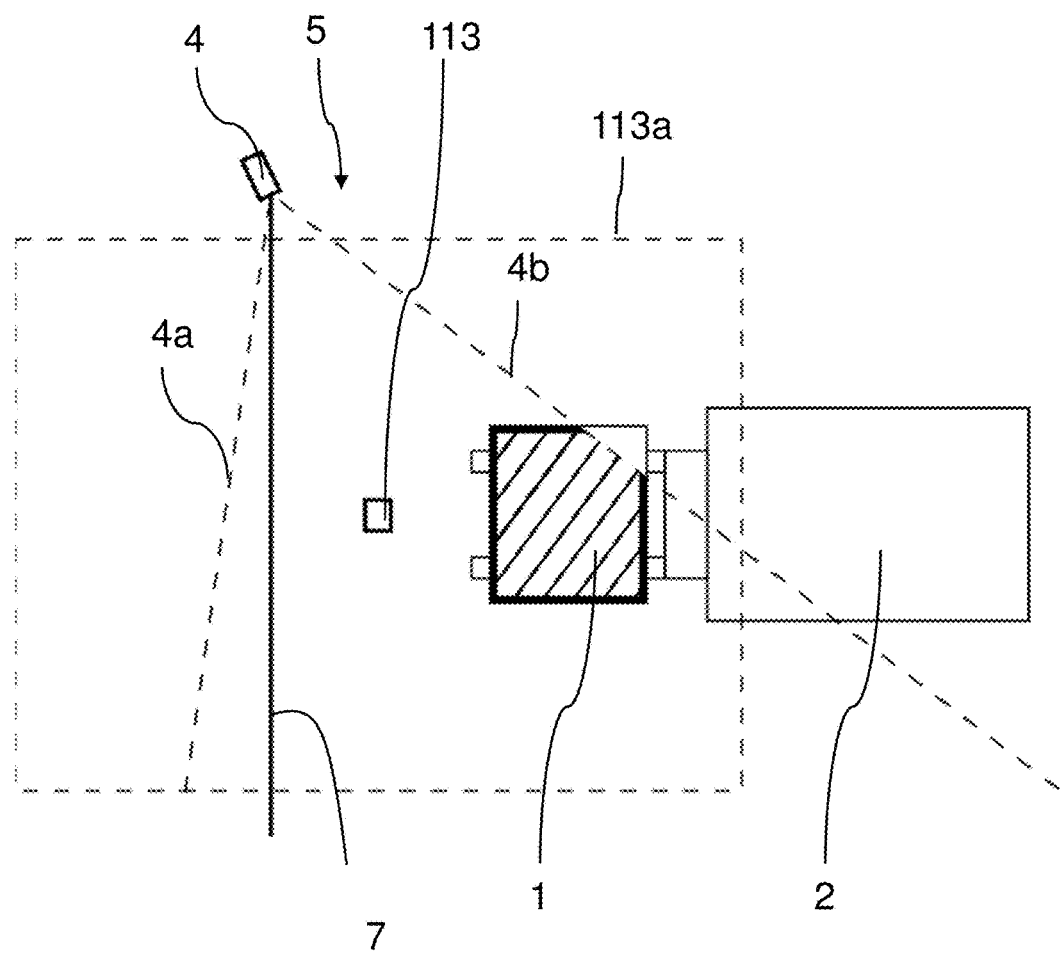
FIG. 11 shows a plan view to illustrate the arrangement of two depth image sensors in accordance with a further form of embodiment.

FIG. 11 illustrates in a plan view an alternative arrangement of the two depth image sensors in accordance with a further design variant. In this design variant a depth image camera 4, as in FIG. 1, is arranged on an outer upper region of the loading gate 7, with which the approaching industrial truck 2 and the object 1 are sensed laterally from above. The viewing angle of the depth image camera 4 is thus directed obliquely forward and obliquely downward. However, the second depth image camera 113 is arranged in a central upper region of the passage region 5, with the direction of view vertically downwards. The dashed lines 4a and 4b, and 113a respectively, once again identify the limits of the visual cones of the depth image cameras 4 and 113a respectively.

The camera 4 is thus arranged on an upper edge of the passage region such that the industrial truck 2 with the object 1, when passing through the passage region 5, is moved past the camera 4 not directly underneath, but rather laterally, that is to say, laterally underneath the latter, while the second camera 113a is arranged centrally above in the passage region 7, with the visual cone vertically downwards, so that the object is sensed directly from above as it passes through the passage region.

Figure 12:
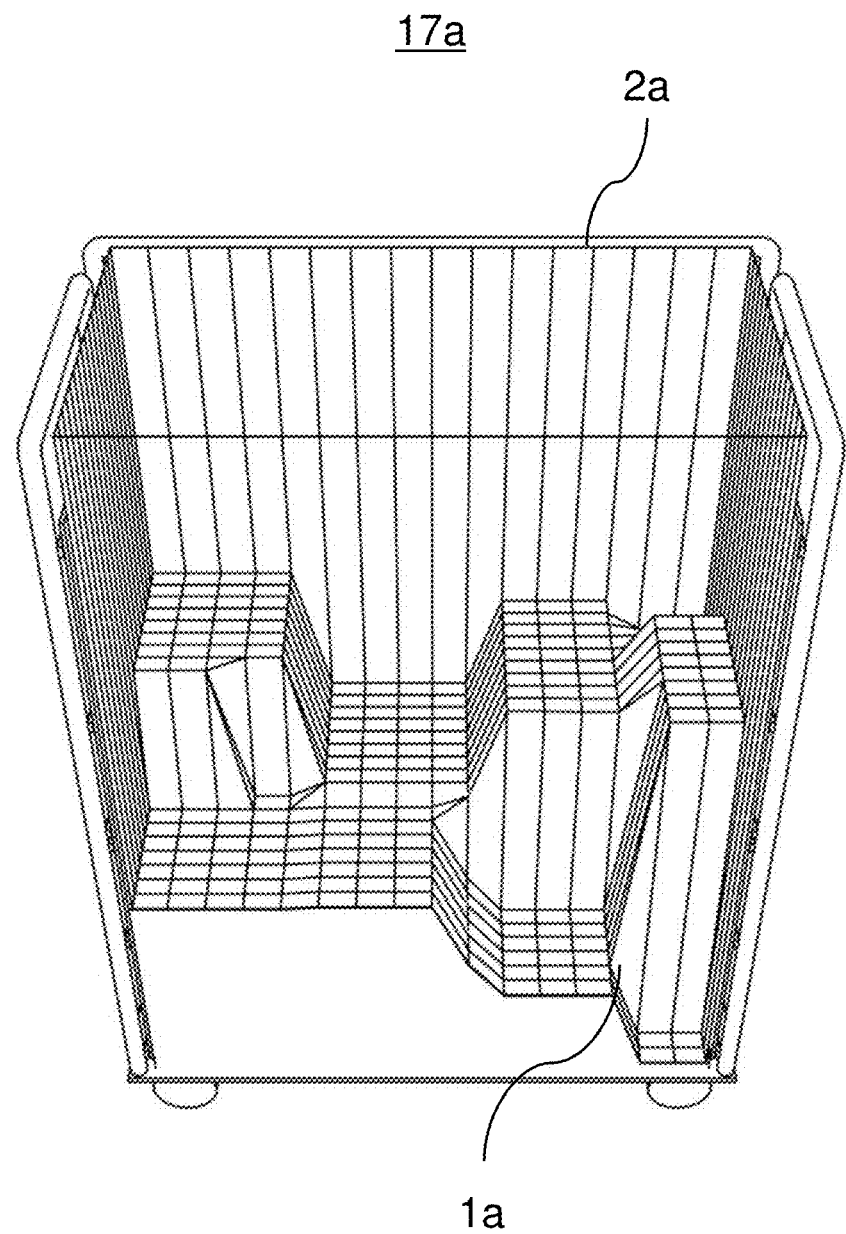
FIG. 12 shows a 3-D model in accordance with a further form of embodiment.

FIG. 12 shows a 3-D model 17a in accordance with a further form of embodiment. In accordance with this form of embodiment the industrial truck is a mobile transport container, which at least partially encloses the shipment that is being transported, in the present case a trolley or a wire mesh cart 2a. The shipment on the trolley consists of a series of packages stacked one upon another, and in the 3-D model 17a is designated by the reference symbol 1a.

In accordance with this form of embodiment the device and the method for determining volume are used in the implementation of a fill level sensor system for wire mesh carts, or trolleys 2a.

Here, as described above, the 3-D model 17a is calculated from the image data of two depth image sensors, so as to be able to demarcate the shipment 1a from the transport container 2a. Here, however, a forklift truck is not subtracted from the scene and then the volume of the pallet determined, as described above in step S6 of FIG. 5. Instead a fill level of the mobile transport container 2a is ascertained. For the calculation the transport container 2a (in this case partially enclosing the shipment) must again be identified and differentiated or demarcated from the shipment. As a result either the length, height and width of the shipment 1a, or the volume of the shipment, can be determined. Alternatively a percentage value can also be determined and outputted as a measure of the volume of the shipment compared with the size of the transport container, i.e. the utilization or fill level.

Although the invention has been described with reference to particular examples of embodiment, it is clear to a person skilled in the art that different modifications can be executed and equivalents can be used as replacements, without moving outside the scope of the invention. In addition many modifications can be executed without moving outside the relevant scope. Accordingly the invention is not to be limited to the disclosed examples of embodiment, but rather the invention is to comprise all examples of embodiment that fall within the range of the accompanying patent claims.

The invention claimed is:

1. A device for determining a volume of an object moved by an industrial truck, comprising:
  a first depth image sensor and a second depth image sensor, which are fixedly arranged such that the object can be sensed from two different directions as the object passes through the passage region,
  the device configured to produce sequences of single images in a first resolution with each of the depth image sensors, wherein the industrial truck and the object are sensed by each of the depth image sensors from different viewing angles as they pass through the passage region; and
  a volume-determining apparatus configured to subject the sequences of the single images in the first resolution of the first depth image sensor and of the second depth image sensor to super resolution processing so as to create a 3-D model including the industrial truck and the object in a second resolution that is higher than the first resolution, and to determine the volume of the object on the basis of the 3-D model produced.

2. The device in accordance with claim 1,
  wherein the two depth image sensors are arranged in the passage region such that a forward region, an upper region, a first lateral region and a second lateral region located opposite to the first lateral region of a surface shape of the object can be sensed, and
  wherein with the first depth image sensor at least the first lateral region can be sensed, and with the second depth image sensor at least the second lateral region can be sensed.

3. The device in accordance with claim 1, wherein the two depth image sensors are arranged and aligned in the passage region such that the moving object can be sensed obliquely from above.

4. The device in accordance with claim 1, wherein the two depth image sensors are arranged in the passage region such that the object, as it passes through the passage region, moves past underneath and between the two depth image sensors.

5. The device in accordance with claim 1,
  wherein the volume-determining apparatus is designed to determine a region of interest (RoI) in the single images comprising the industrial truck and the object, for which super resolution processing is executed by ascertaining elements moving in the image sequences, and
  wherein moving elements are ascertained on the basis of pixel regions for which an item of distance information alters relative to a predecessor image or relative to a background image that does not contain the industrial truck and the object.

6. The device in accordance with claim 5, wherein for the determination of the region of interest (RoI) only those moving elements are used that exceed a predetermined minimum size move along a prescribed direction or trajectory.

7. The device in accordance with claim 1, wherein for the super resolution processing firstly data from the sequence of single images of the first depth image sensor are combined in time, and data from the sequence of single images of the second depth image sensor are combined in time, and time-wise combined image data of the first depth image sensor are then spatially combined with time-wise combined image data of the second depth image sensor.

8. The device in accordance with claim 1, wherein the volume-determining apparatus is designed so as to supplement and to correct image information that is missing or subject to errors in the single images when creating the 3-D model in the super resolution processing.

9. The device in accordance with claim 1, wherein axes of visual cones of the two depth image sensors are inclined towards one another.

10. The device in accordance with claim 1, wherein a visual cone of at least one depth image sensor is designed such that a rear face of the object, as it passes through the passage region, can be sensed for a short period, at least as the object is again exiting from the visual cone.

11. The device in accordance with claim 1, wherein the volume-determining apparatus is designed so as to use a predetermined labelling on the industrial truck, attached at a point that cannot be concealed by the object, for purposes of demarcating the object from the industrial truck.

12. The device in accordance with claim 11, wherein
(a) the labelling is arranged laterally with respect to a direction of travel on a lift mast of the industrial truck; and
(b) the volume-determining apparatus is set up,
    (b1) on a basis of the sensed labelling to determine an inclination of the lift mast, and a demarcation plane parallel to the lift mast, together with a base plane of the load at right angles to the latter, wherein the demarcation plane and the base plane bound a possible location of the object; and
    (b2) on a basis of the sensed labelling to determine a vertical movement of the object executed relative to the industrial truck.

13. The device in accordance with claim 12, wherein the labelling is designed in the form of strips.

14. The device in accordance with claim 11, further comprising a synchronized RGB camera for purposes of detecting the labelling.

15. The device in accordance with claim 1, wherein
(a) the device is designed to sense a sequence of single images of the unloaded industrial truck as it travels through the passage region; and
(b) the volume-determining apparatus is designed, on a basis of the sequence of single images, to determine a surface shape of the industrial truck, which is used for purposes of demarcating a surface shape of the object from the surface shape of the industrial truck in the 3 D model.

16. The device in accordance with claim 1, further comprising a database, in which 3-D models of various industrial trucks are stored, wherein for purposes of demarcating a surface shape of the object from the surface shape of the industrial truck, the volume-determining apparatus is designed such that the surface shape of the industrial truck in the 3-D model can be ascertained by use of the stored 3-D models and prescribed identification features.

17. The device in accordance with claim 1, wherein
(a) the first depth image sensor and the second depth image sensor operate in accordance with a method providing a pixel image including one of a structured light principle, a time of flight principle, and a stereo vision principle; and
(b) the first depth image sensor and the second depth image sensor are arranged at a height above the floor of 2 to 4 meters, and are arranged spaced apart from one another by 2.5 to 4 meters transverse to a direction of movement of the object in the passage region.

18. The device in accordance with claim 1, wherein
(a) for purposes of creating the 3-D model of the object depth image data from the first depth image sensor and the second depth image sensor are exclusively used; or
(b) one or two additional depth image sensors are arranged in a lower section of the passage region; or
(c) an additional depth image sensor is provided, which for purposes of detecting a rear edge rear face of the object is aligned essentially vertically downwards.

19. The device in accordance with claim 1, wherein
(a) the object is a shipment or goods loaded onto an industrial truck;
(b) the industrial truck is a forklift truck, an electric lift truck, a low-lift truck, a high-lift truck, a hand pallet truck, an order-picking truck, a high-reach forklift truck, a platform truck, a trolley, or a wire mesh cart; and
(c) the passage region is a loading gate, a loading passage, an industrial door, a garage door, an interior door, a loading bay, a tunnel, a portal, or a marked path section.

20. A method for determining the volume of an object moved by an industrial truck, comprising the steps:
(a) arrangement of a first depth image sensor and a second depth image sensor fixedly in a passage region of the object being moved, such that the industrial truck and the object are sensed by each of the depth image sensors from two different directions as they pass through the passage region;
(b) production of sequences of single images in a first resolution with each of the depth image sensors, which show the industrial truck and the object from different viewing angles as the latter pass through the passage region;
(c) production of a 3-D model comprising the industrial truck and the object with a second resolution, which is higher than the first resolution, by executing super resolution processing on a basis of the sequences of single images in a first resolution of the first depth image sensor and the second depth image sensor; and
(d) determination of the volume of the object on the basis of the 3-D model produced.

* * * * *